United States Patent
Seki et al.

(10) Patent No.: US 8,120,719 B2
(45) Date of Patent: Feb. 21, 2012

(54) PHOTO-ADDRESSABLE DISPLAY MEDIUM AND PHOTO-ADDRESSABLE DISPLAY DEVICE

(75) Inventors: Mieko Seki, Kanagawa (JP); Hiroe Okuyama, Kanagawa (JP); Yasuhiro Yamaguchi, Kanagawa (JP); Tomozumi Uesaka, Kanagawa (JP); Hideo Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 141 days.

(21) Appl. No.: 12/749,582

(22) Filed: Mar. 30, 2010

(65) Prior Publication Data

US 2011/0051024 A1    Mar. 3, 2011

(30) Foreign Application Priority Data

Aug. 26, 2009 (JP) ................................ 2009-195960

(51) Int. Cl.
*G02F 1/135* (2006.01)
*G09G 3/34* (2006.01)
*G03G 5/047* (2006.01)
*G03G 5/147* (2006.01)

(52) U.S. Cl. .................... 349/25; 430/58.7; 347/239

(58) Field of Classification Search ............. 349/2–4, 349/24–25, 27; 315/169.1; 347/84, 87, 234, 347/239; 428/424.8, 433, 457; 430/58.7, 430/59, 66, 123.42
See application file for complete search history.

(56) References Cited

U.S. PATENT DOCUMENTS

| | | | |
|---|---|---|---|
| 6,653,796 B2 * | 11/2003 | Kimura | 315/169.3 |
| 6,774,880 B2 * | 8/2004 | Kobayashi | 345/84 |
| 7,416,823 B2 * | 8/2008 | Yanagawa et al. | 430/58.7 |
| 2002/0005227 A1 * | 1/2002 | Foltz et al. | 141/301 |
| 2002/0012042 A1 * | 1/2002 | Kobayashi et al. | 347/239 |
| 2003/0012916 A1 | 1/2003 | Kobayashi et al. | |
| 2010/0231829 A1 * | 9/2010 | Morikawa et al. | 349/78 |

FOREIGN PATENT DOCUMENTS

| | | |
|---|---|---|
| JP | 2002-189200 A | 7/2002 |
| JP | 2003-005671 A | 1/2003 |

* cited by examiner

*Primary Examiner* — Akm Ullah
(74) *Attorney, Agent, or Firm* — Sughrue Mion, PLLC (57) ABSTRACT

A photo-addressable display medium is provided, the photo-addressable display medium including: a pair of electrodes having transparency; a photoconductive layer disposed between the pair of electrodes and having a laminated structure of a first charge generation layer, a charge transport layer and a second charge generation layer in this order from an exposing light irradiation side; and a liquid crystal layer disposed between an electrode of the inverse side to the exposing light irradiation side and the second charge generation layer and having memory performance, wherein the first charge generation layer and the second charge generation layer contain a phthalocyanine compound, and the charge transport layer contains a stilbene compound represented by the following formula (1):

formula (1)

wherein, $R_1$ to $R_4$ each independently represents a hydrogen atom, a methyl group or an ethyl group.

7 Claims, 3 Drawing Sheets

PHOTO-ADDRESSABLE DISPLAY MEDIUM AND PHOTO-ADDRESSABLE DISPLAY DEVICE

CROSS-REFERENCE TO RELATED APPLICATIONS

This application is based on and claims priority under 35 U.S.C. 119 from Japanese Patent Application No. 2009-195960 filed Aug. 26, 2009.

BACKGROUND

1. Technical Field

The present invention relates to a photo-addressable display medium and a photo-addressable display device.

2. Related Art

As conventional photo-addressable display media and photo-addressable display devices, for example, there are photo-addressable display media formed by combining a photoconductive element that switches a functional element driven by an alternating electric field or alternating current, which results from stacking sequentially at least an electrode layer, a lower part charge generation layer, a charge transport layer and an upper part charge generation layer, with a functional element (a display element) on a substrate and photo-addressable display devices and the like.

SUMMARY

According to an aspect of the present invention, there is provided a photo-addressable display medium, including:

a pair of electrodes having transparency;

a photoconductive layer disposed between the pair of electrodes, the photoconductive layer having a laminated structure of a first charge generation layer, a charge transport layer and a second charge generation layer in this order from an exposing light irradiation side; and a liquid crystal layer disposed between an electrode of an inverse side to the exposing light irradiation side out of the pair of electrodes and the second charge generation layer, the liquid crystal layer having memory performance, wherein the first charge generation layer and the second charge generation layer contain a phthalocyanine compound, and the charge transport layer contains a stilbene compound represented by following formula (1):

formula (1)

wherein, $R_1$ to $R_4$ each independently represents a hydrogen atom, a methyl group or an ethyl group.

BRIEF DESCRIPTION OF THE DRAWINGS

Exemplary embodiment of the present invention will be described in detail based on the following figures, wherein.

DETAILED DESCRIPTION

Figure 1:
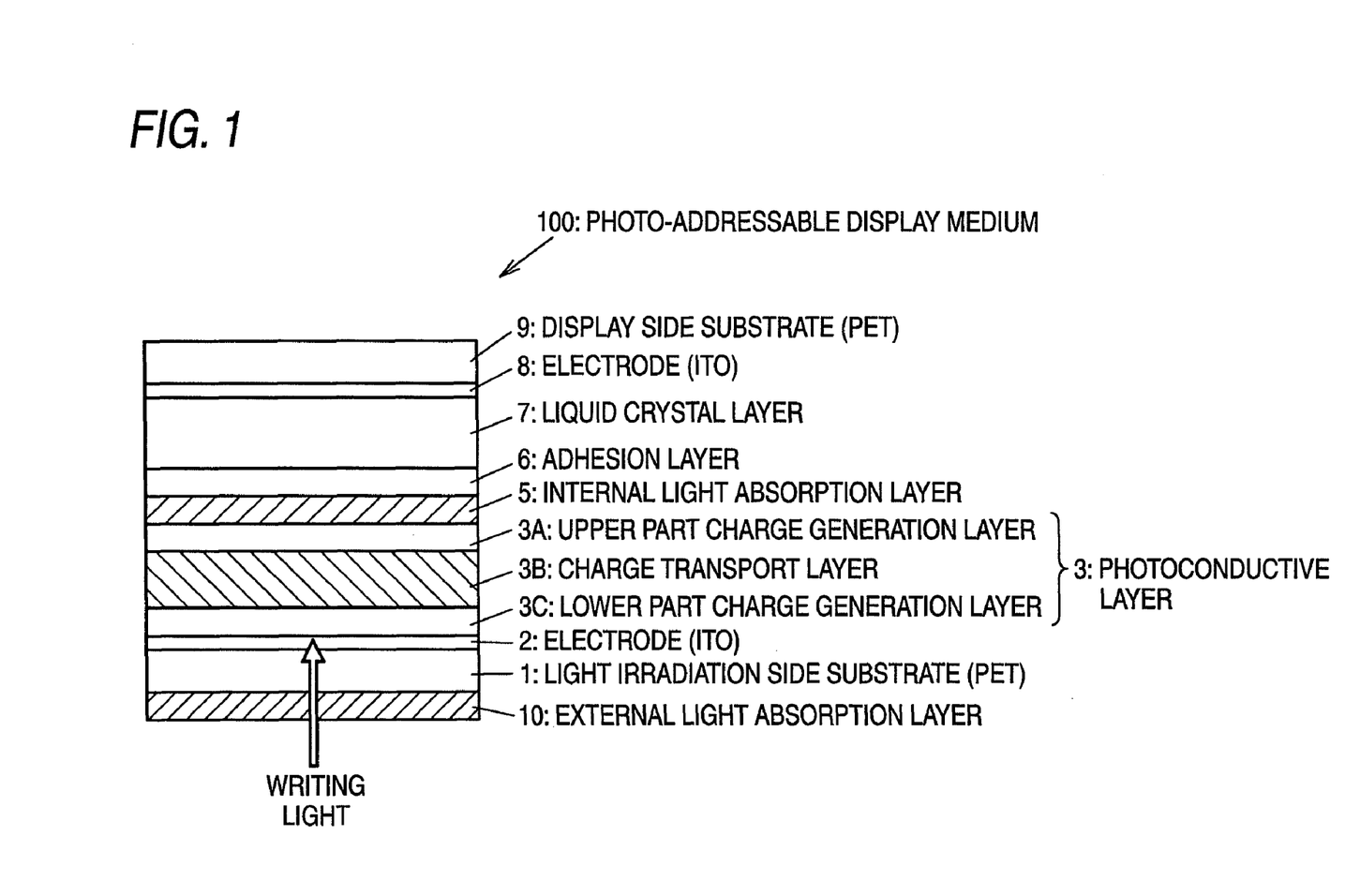
FIG. 1 is an outline view showing a constitutional example of a photo-addressable display medium according to an exemplary embodiment of the invention.

Constitution of Photo-Addressable Display Medium:

FIG. 1 is an outline view showing a constitutional example of a photo-addressable display medium according to an exemplary embodiment of the present invention.

A photo-addressable display medium 100 according to an exemplary embodiment of the invention is constituted by having, for example in order from a light irradiation side, a light irradiation side substrate 1, an electrode 2, a photoconductive layer 3 (a lower part charge generation layer 3C/a charge transport layer 3B/an upper part charge generation layer 3A), an internal light absorption layer 5, an adhesion layer 6, a liquid crystal layer 7, an electrode 8, and a display side substrate 9. The lower part charge generation layer 3C corresponds to a first charge generation layer, and the upper part charge generation layer 3A corresponds to a second charge generation layer. An isolation layer having translucency (not shown) may be set for purpose of increasing adhesiveness, quality of layer or electric property, in some case. The isolation layer may be arranged, for example, between an upper part charge generation layer and a light absorption layer. Depending on a material or a formation method to be used, the isolation layer may be arranged between the photoconductive layer 3 and the internal light absorption layer 5, in order to prevent the photoconductive layer 3 from being damaged. In addition, an external light absorption layer 10 may be arranged on the light irradiation side of the light irradiation side substrate 1, in order to absorb external light that is unnecessary and gives damage to the medium.

Hereinafter, the constitution of respective sections of the photo-addressable display medium 100 will be described. Meanwhile, "light irradiation" means "irradiation of light for writing" unless otherwise noted.

Light Irradiation Side Substrate 1, Display Side Substrate 9:

The light irradiation side substrate 1 and the display side substrate 9 hold respective layers between the substrates, to maintain the structure of the display medium 100. The substrates 1 and 9 are not necessarily to be provided, but are desirably provided for maintaining the form or protecting the surface of the display medium 100.

The light irradiation side substrate 1 is constituted of an optically transparent material through which exposing light may transmit. Specifically, a substrate constituted of glass, ceramic, triacetylcellulose, polyethylene terephthalate (PET), polycarbonate (PC), polyethylene, polystyrene, polyimide, polyether sulfone (PES), or the like is used. From the standpoint of flexible properties, forming simplicity, cost and the like, the use of a sheet or a film constituted of PET or the like is desirable.

The display side substrate 9 is constituted of the same material as that of the light irradiation side substrate 1, but the use of glass, PET or the like having transparency that allows light in a visible region to transmit substantially (transmittance of 80% or more) so as not to hinder the display.

As the thickness of the substrates 1 and 9, the range from 50 μm to 500 μm is favorable.

Electrode 2, Electrode 8:

Electrodes 2 and 8 are members for applying voltage to be applied via feeding terminals (not shown) to respective layers provided between electrodes 2 and 8, and are constituted from a material having an electroconductive property.

The electrode 2 is constituted from an optically transparent material that allows exposing light to transmit. For example, metallic thin films of gold (Au), Aluminum (Al), copper (Cu) or the like; electroconductive metal oxides such as indium tin oxide (ITO), tin oxide ($SnO_2$) or zinc oxide (ZnO); or thin films of translucent electric conductor such as electroconductive polymer (e.g. polypyrrole) is used, and the use of an ITO film is desirable.

The electrode 8 is constituted from the same material as that for the transparent electrode 3, and the use of an ITO film is desirable, which has transparency that allows light invisible region to transmit so as not to hinder the display.

No particular limitation is imposed on the thickness of these electrodes 2 and 8, but thickness in the range from 10 nm to 10 μm is favorable. These electrodes 2 and 8 may be formed on the substrates 1 and 9 by evaporation, sputtering, or the like.

Photoconductive Layer 3:

The photoconductive layer 3 is arranged between the electrode 2 and the electrode 8, and has a structure obtained by laminating the lower part charge generation layer 3C, the charge transport layer 3B, and the upper part charge generation layer 3A in order from the exposing light irradiation side. As the photoconductive layer 3, it is sufficient only when the charge transport layer is placed between charge generation layers, and a photoconductive structure having such laminated structure as a charge generation layer/a charge transport layer/a charge generation layer/a charge transport layer/a charge generation layer is also possible.

The photoconductive layer 3 changes impedance properties in accordance with the irradiation intensity of the exposing light, and shows the distribution of electric properties in accordance with the distribution of the irradiation intensity of the exposing light. That is, the photoconductive layer 3 has sensitivity for light in the wavelength region of the exposing light and absorbs light in the wavelength region to show the distribution of electric properties in accordance with the distribution of the irradiation intensity of the exposing light.

The upper part charge generation layer 3A and the lower part charge generation layer 3C have function of absorbing the exposing light to generate charges, and contain phthalocyanine compound as a charge generation material.

As the phthalocyanine compound, chlorogallium phthalocyanine, hydroxygallium phthalocyanine, titanyl phthalocyanine, oxytitanyl phthalocyanine, dichlorotin phthalocyanine or the like may be used, but the use of phthalocyanine compound selected from (1) chlorogallium phthalocyanine of a crystalline structure having diffraction peaks at the Bragg angle (2θ±0.2°) of i) 7.4°, 16.6°, 25.5° and 28.3°, ii) 6.8°, 17.3°, 23.6° and 26.9°, or iii) 8.7° to 9.2°, 17.6°, 24.0°, 27.4° and 28.8° in an X-ray diffraction spectrum, (2) hydroxygallium phthalocyanine of a crystalline structure having diffraction peaks at the Bragg angle (2θ±0.2°) of i) 7.5°, 9.9°, 12.5°, 16.3°, 18.6°, 25.1° and 28.3°, ii) 7.7°, 16.5°, 25.1° and 26.6°, iii) 7.9°, 16.5°, 24.4° and 27.6°, iv) 7.0°, 7.5°, 10.5°, 11.7°, 12.7°, 17.3°, 18.1°, 24.5°, 26.2° and 27.1°, v) 6.8°, 12.8°, 15.8° and 26.0°, or vi) 7.4°, 9.9°, 25.0°, 26.2° and 28.2° in an X-ray diffraction spectrum, and (3) titanyl phthalocyanine of a crystalline structure having diffraction peaks at the Bragg angle (2θ±0.2°) of i) 9.3° and 26.3°, or ii) 9.5°, 9.7°, 11.7°, 15.0°, 23.5°, 24.1° and 27.3° in an X-ray diffraction spectrum is desirable from the standpoint that the effect of the invention is more remarkably exerted.

In the charge generation layers 3A and 3C, the phthalocyanine compound may be used alone or in mixture.

For the upper part charge generation layer 3A and the lower part charge generation layer 3C, the same degree of carriers and free electrons are necessary to be generated. Therefore, they needs to have the same degree of sensitivity for wavelength, light amount and voltage, and the same material is desirably used for the upper and lower layers, but different materials may be used when they have comparable sensitivities.

As a method for forming the charge generation layers 3A and 3C, in addition to dry film-forming methods such as a vacuum evaporation method, a sputtering method, an ion plating method or a CVD method, wet film-forming methods, such as a spin coat method, a dip method, a bar coat method, a roll coat method, a casting method, a blade coating method or a spray coating method using a solution or a dispersion liquid containing a charge generation material and binder resin, are applicable. When using the solution or the dispersion liquid, the concentration of the charge generation material in the liquid is desirably from 1% by mass to 20% by mass, more desirably from 1.5% by mass to 5% by mass.

As the binder resin for use in the charge generation layer, for example, polycarbonate resin, polyvinyl butyral resin, polyallylate resin, polyethylene resin, polyester resin, phenoxy resin, vinyl chloride-vinyl acetate resin, carboxyl-modified vinyl chloride-vinyl acetate copolymer, polyamide resin (including nylon resin), acrylic resin, polyacrylamide resin, polyvinylpyridine resin, cellulose resin, urethane resin, epoxy resin, casein, polyvinyl alcohol resin, polyvinyl pyrrolidone resin, or the like may be used. Here, since carboxyl-modified vinyl chloride-vinyl acetate copolymer is soluble in keto-alcohol, and favorably disperses hydroxygallium phthalocyanine or the like being a charge generation material, it is a desirable binder resin. These may be used alone, or in two or more kinds in combination.

Examples of solvents usable for the solution or the dispersion liquid include alcohols such as methanol, ethanol, n-propanol, i-propanol, n-butanol or benzyl alcohol, ketones such as acetone, methyl ethyl ketone or cyclohexanone, cyclopentanone, amides such as dimethylformamide or dimethylacetamide, sulfoxides such as dimethylsulfoxide, cyclic or chain ethers such as tetrahydrofuran, dioxane, diethyl ether, methyl cellosolve or ethyl cellosolve, esters such as methyl acetate, ethyl acetate or n-butyl acetate, aliphatic halogenated hydrocarbons such as methylene chloride, chloroform, carbon tetrachloride, chloroethylene or trichloroethylene, mineral oil such as ligroin, aromatic hydrocarbons such as benzene, toluene or xylene, and aromatic halogenated hydrocarbons such as chlorobenzene or dichlorobenzene.

The mixing ratio of the charge generation material and the binder resin (charge generation material/binder resin) in the charge generation layers 3A and 3C is desirably in the range from 1/10 to 20/1, more desirably in the range from 1/1 to 10/1.

The thickness of the charge generation layers 3A and 3C is desirably from 10 nm to 1 μm, more desirably from 20 nm to 500 nm. When the thickness is smaller than 10 nm, photosensitivity is insufficient and production of a uniform film becomes difficult, and when it is larger than 1 μm, the photosensitivity is saturated and peeling tends to occur due to intra-film stress.

The charge transport layer 3B has such function that charges generated in the upper part charge generation layer 3A or the lower part charge generation layer 3C are injected and drift in the direction of an applied electric field, and contains a stilbene compound shown by the following Formula (1) as a charge transport material.

Formula (1)

Desirably it contains a stilbene compound shown by the following Formula (2), and more desirably it contains at least one kind of stilbene compound selected from stilbene compounds shown by the following structural formula (III-1), (III-2) or (III-3), from the standpoint that the effect of the invention is more remarkably exerted.

Formula (2)

structural formula (III-1)

structural formula (III-2)

structural formula (III-3)

For the charge transport layer 3B, the above-described stilbene compound may be used alone or in mixture.

As a method for forming the charge transport layer 3B, the same method as that for forming the charge generation layers 3A and 3C described above may be applied. When using a solution or a dispersion liquid containing the charge transport material and the binder resin, the concentration of the charge transport material in the liquid is desirably from 5% by mass to 50% by mass, more preferably from 10% by mass to 20% by mass.

As a binder resin for use in the charge transport layer, the same one as the binder resin that is used for the charge transport layer as described above may be used, but polycarbonate resin is desirable from the standpoint of charge transport properties, strength, flexibility and transparency.

Examples of the solvent usable for the solution or the dispersion liquid include aforementioned ketones, cyclic or chain ethers, aliphatic halogenated hydrocarbons, aromatic hydrocarbons, aromatic halogenated hydrocarbons and the like.

The mixing ratio of the charge transport material and the binder resin in the charge transport layer 3B (the charge transport material/binder resin) is desirably in the range from 1/10 to 10/1, more desirably from 3/7 to 7/3.

The thickness of the charge transport layer 3B is desirably from 1 μm to 100 μm, more desirably from 1 μm to 50 μm, furthermore preferably from 3 μm to 20 μm. When it is less than 1 μm, voltage endurance lowers and the securement of the reliability becomes difficult, and when it is more than 100 μm, the impedance matching with a functional element becomes difficult and occasionally the design becomes difficult.

Functional Layer:

Between the photoconductive layer 3 and the liquid crystal layer 7, any functional layer may be provided. For example, an isolation layer, an internal light absorption layer 5, and an adhesion layer 6 described below may be provided respectively. Alternatively, a functional layer having these plural functions at the same time may be provided. Such functional layer may be applied in a range that does not considerably hinder the flow of electric current. The order of the isolation layer, the internal light absorption layer 5, and the adhesion layer 6 may be changed, but the isolation layer desirably lies adjacent to the photoconductive layer 3.

Isolation Layer:

Depending on the material or formation method of the internal light absorption layer 5 or the adhesion layer 6, the photoconductive layer 3 is occasionally damaged, and the isolation layer is provided to prevent this phenomenon.

As the material for the isolation layer, a water-soluble resin, a water/organic solvent soluble resin, an aqueous emulsion, dispersion or latex, or the like is utilized. The isolation layer has such a purpose, for example, as preventing the diffusion of a low molecular nonaqueous component or an organic solvent contained in an adhesive of the adhesion layer 6, and, therefore, a water-soluble resin that is hardly swollen by an organic solvent is most desirable.

As the water-soluble resin, in addition to polyvinyl alcohol, alkyl celluloses such as methyl cellulose or ethyl cellulose, carboxymethyl cellulose, hydroxymethyl cellulose, hydroxypropyl cellulose, polyethylene imine, polyacrylic acid, polyacrylic acid, polyacrylic acid esters such as polyacrylic acid salt or polyacrylamide, polyethylene oxide, polyvinyl pyrrolidone, starch, casein, glue, gelatin, gum arabic, guar gum, alginate, locust bean gum, carrageenan, tamarind and pectin, urethane resin, epoxy resin and acrylic resin having such a hydrophilic group as a hydroxyl group, a carboxyl group, a sulfonic group or an amino group, and the like may be utilized.

As the water/organic solvent-soluble resin, ethylene-vinyl alcohol copolymer, polyacrylamide, polyethylene imine, polyvinyl pyrrolidone, polyglycerin, and various kinds of water/organic solvent-soluble resins may be utilized.

As the aqueous emulsion, dispersion or latex, ethylene-vinyl acetate copolymer, ethylene-vinyl chloride copolymer, polyurethane, polyacrylate, styrene-butadiene rubber, nitrile-butadiene rubber, and the like may be utilized. Internal light absorption layer 5:

The internal light absorption layer 5 is provided for such purposes as optically separating the exposing light from reading write to inhibit a false operation caused by mutual interference, and optically separating light entering from the non-display surface side (the substrate 1 side) of the display medium 100 from the displayed images displayed on the liquid crystal layer 7 upon the display to inhibit the degradation of the image quality. The reading light is light that enters the internal light absorption layer 5 from the display surface side (the substrate 9 side) of the display medium 100 while transmitting the liquid crystal layer 7, which includes sunlight, room light and the like.

Specifically, the internal light absorption layer 5 shows desirably light absorption properties of the absorbance 1 or more in the range of wavelength to be absorbed, more desirably light absorption properties of the absorbance 2 or more.

The material for use in the internal light absorption layer 5 is determined based on the range of wavelength to be absorbed, and ordinary pigment or dye may be employed, utilizing resin with dispersed pigment, resin with dissolved dye, resin colored with dye, or the like. As the pigment, inorganic compounds such as carbon black, aniline black or chromium oxide, and organic compounds such as azo compound or phthalocyanine compound are utilized. As the dye, nitroso dye, nitro dye, stilbene azo dye, diphenylmethane dye, triphenylmethane dye, xanthene dye, quinoline dye, polymethine dye, thiazole dye, indophenol dye, azine dye, oxazine dye, thiazine dye, sulfureted dye, aminoketone dye, anthraquinone dye, indigoid dye, and the like are utilized.

As the resin for dispersing the pigment or dissolving the dye, in order to make a coated film upon coating have film-forming properties, a water-soluble resin is utilized. The polymerization degree of the water-soluble resin is not limited as far as the water-soluble resin forms a film. Examples of water-soluble resins include fully or partially saponified polyvinyl alcohol, water-soluble polyvinyl acetal, water-soluble polyvinyl formal, polyacrylamide, polyvinyl pyrrolidone, poly(meth)acrylic acid, water-soluble poly(meth) acrylic acid copolymer, polyalkylene oxide, water-soluble polyester, polyethylene glycol, and water-soluble maleic acid resin, and the like. Among these, polyvinyl alcohol, and polyvinyl alcohol derivatives such as water-soluble polyvinyl acetal or water-soluble polyvinyl formal are particularly desirable.

As the method for forming the internal light absorption layer 5, there are mentioned printing methods such as screen printing, relief printing, intaglio printing, lithographic printing or flexographic printing, and coating methods such as a spin coat method, a bar coat method, a dip coat method, a roll coat method, a knife coat method or a die coat method.

The internal light absorption layer 5 desirably has a thickness from 1 μm to 10 μm. Further, the internal light absorption layer 5 is desirably constituted as an insulating layer.

Adhesion Layer 6:

The adhesion layer 6 is provided for the purpose of absorbing irregularity and playing a roll of adhesion upon laminating respective layers formed for the substrates 1 and 9.

The adhesion layer 6 is constituted of a high-molecular weight material having low glass transition temperature, wherein a material that sticks or adheres layers being objects to be laminated (in the exemplary embodiment, the internal light absorption layer 5 and the liquid crystal layer 7) by heat or pressure is selected. Further, in the exemplary embodiment, the adhesion layer 6 is desirably constituted as an insulating layer.

As the material for the adhesion layer 6, publicly known adhesives are utilized, including acrylic-based, urethane-based, cyano acrylate-based and silicone-based ones, rubber-based ones including isoprene, ethylene-vinyl acetate copolymer, and the like. No particular limitation is imposed on the type of the adhesive, including a two-component-curing type, a heat-curing type, a moisture-curing type, a ultraviolet-curing type, a hot-melt type, a pressure-sensitive type (an agglutinant), and the like.

Liquid Crystal Layer 7:

The liquid crystal layer 7 is desirably the liquid crystal layer 7 with a memory performance, and is provided between the electrode 8 on the reverse side relative to the exposing light irradiation side out of the pair of electrodes 2 and 8, and the upper part charge generation layer 3A.

As the liquid crystal layer 7 having a memory performance, for example, a liquid crystal layer having a memory performance may be mentioned. A liquid crystal having a memory performance is a liquid crystal having such characteristic that keeps the alignment of the liquid crystal for a certain period of time by controlling the alignment by the application of voltage and even after releasing the applied voltage. For example, there are polymer-dispersed liquid crystal (PDLC), ferroelectric liquid crystal such as chiral smectic C-phase, cholesteric liquid crystal, and the like. Further, a liquid crystal layer formed after encapsulating these is also applicable. The liquid crystal with a memory performance does not require electric power for maintaining the image display because of the memory performance, and makes it possible to use the display medium 100 in a state separated from a photo-writing device. Meanwhile, as the liquid crystal layer 7 with a memory performance, there may be mentioned an electrochromic element, an electrophoretic element and an electric field rotation element, in addition to the liquid crystal display layer.

In the exemplary embodiment, when connecting the photoconductive layer 3 and the liquid crystal layer 7, it is preferable to unite these with the adhesion layer 6 to form the photo-addressable display medium 100. By the unification, it is possible to stabilize the connection between the photoconductive layer 3 and the liquid crystal layer 7. Since the united photo-addressable display medium 100 may be separated from a photo-writing device, the display medium 100 may be, for example, distributed.

External Light Absorption Layer 10:

The external light absorption layer 10 is provided as the outermost layer on the writing side, that is, outside the light irradiation side substrate 1. The external light absorption layer 10 is provided for the purpose of absorbing light having wavelengths other than the wavelength used for writing, which is irradiated from the light irradiation side of the display medium 100 (in FIG. 1, the substrate 1 side) to the display medium 100. Consequently, for the external light absorption layer 10, a material, which transmits exposing light (desirably with a transmittance of 80% or more) and absorbs light that is not used for the writing, is used. When the charge generation material is phthalocyanine compound and the exposing light is in the wavelength range from 600 nm to 700 nm, for example, light absorption performance of absorbance 1 or more (desirable 2 or more) is desirable for all the wavelength region from 300 nm to 550 nm being shorter wavelength light. This suppresses the irradiation of light, which has wavelengths other than the wavelength used for the writing, to the photoconductive layer 3.

For the external light absorption layer 10, resin dispersed with pigment is utilized, which is formed, for example, by coating and drying a coating liquid prepared by dispersing pigment in a water-insoluble resin liquid. As the pigment, one that satisfies only the light absorption performance that is required as the external light absorption layer 10 is sufficient, and generally used red pigment (such as pyrrolo pyrrole based compounds and quinacridone based compounds) or yellow pigment (such as indoline based compounds and ferric hydroxide based compounds) may be used. These may be used alone, or in two or more kinds in mixture.

As the resin for use in the external light absorption layer 10, water-insoluble resin is preferable because of good manufacturability and good adhesiveness with the substrate 1, and resin such as alkyd (phthalic acid) resin, vinyl chloride resin, vinylidene chloride resin, unsaturated polyester resin, melamine resin, urea resin, phenol resin, acrylic resin, polyurethane resin, vinyl acetate resin, epoxy resin, cellulose, silicone resin or butyral resin may be utilized. A hardening agent such as polyisocyanate or a thickener may be contained as an additive.

As a method for forming the external light absorption layer 10, a printing method such as screen printing, relief printing, intaglio printing, lithographic printing or flexographic printing, or a coating method such as a spin coat method, a bar coat method, a dip coat method, a roll coat method, a knife coat method or a die coat method is employed. In the coating method, a coating liquid prepared by dispersing or dissolving the pigment with the resin in an appropriate solvent may be used.

The thickness of the external light absorption layer 10 is not particularly limited, but is preferably in the range that does not damage the portability or flexibility of the display medium 100. For example, it is desirably from 1 μm to 50 μm.

Meanwhile, the external light absorption layer 10 is not necessarily laminated in the photo-addressable display medium 100, but is desirably arranged in a unified manner to the photo-addressable display medium 100. This makes it possible to exert light resistance more significantly for allowing it to be used in environments that are exposed to sunlight such as places near a window or out of doors, as compared with an instance in which no external light absorption layer 10 is provided.

Production of Photo-Addressable Display Medium:

The photo-addressable display medium 100 according to the exemplary embodiment is prepared according to a procedure below.

On the electrode 2 formed on the substrate 1, the lower part charge generation layer 3C, the charge transport layer 3B and the upper part charge generation layer 3A are laminated successively to form the photoconductive layer 3. Then, on the photoconductive layer 3, the internal light absorption layer 5 and the adhesion layer 6 are laminated successively to form a laminated body A.

On the other hand, on the electrode 8 formed on the substrate 9, the liquid crystal layer 7 is formed to form a laminated body B.

Next, the laminated body A and the laminated body B are bonded so that the adhesion layer 6 of the laminated body A contacts to the liquid crystal layer 7 of the laminated body B to form a laminated body C.

Further, when arranging the external light absorption layer, separately, the external light absorption layer 10 and the adhesion layer are laminated on a substrate to form a laminated body D, and the adhesion layer of the laminated body D is bonded to the substrate 1 of the laminated body C to prepare the display medium 100.

Figure 2:
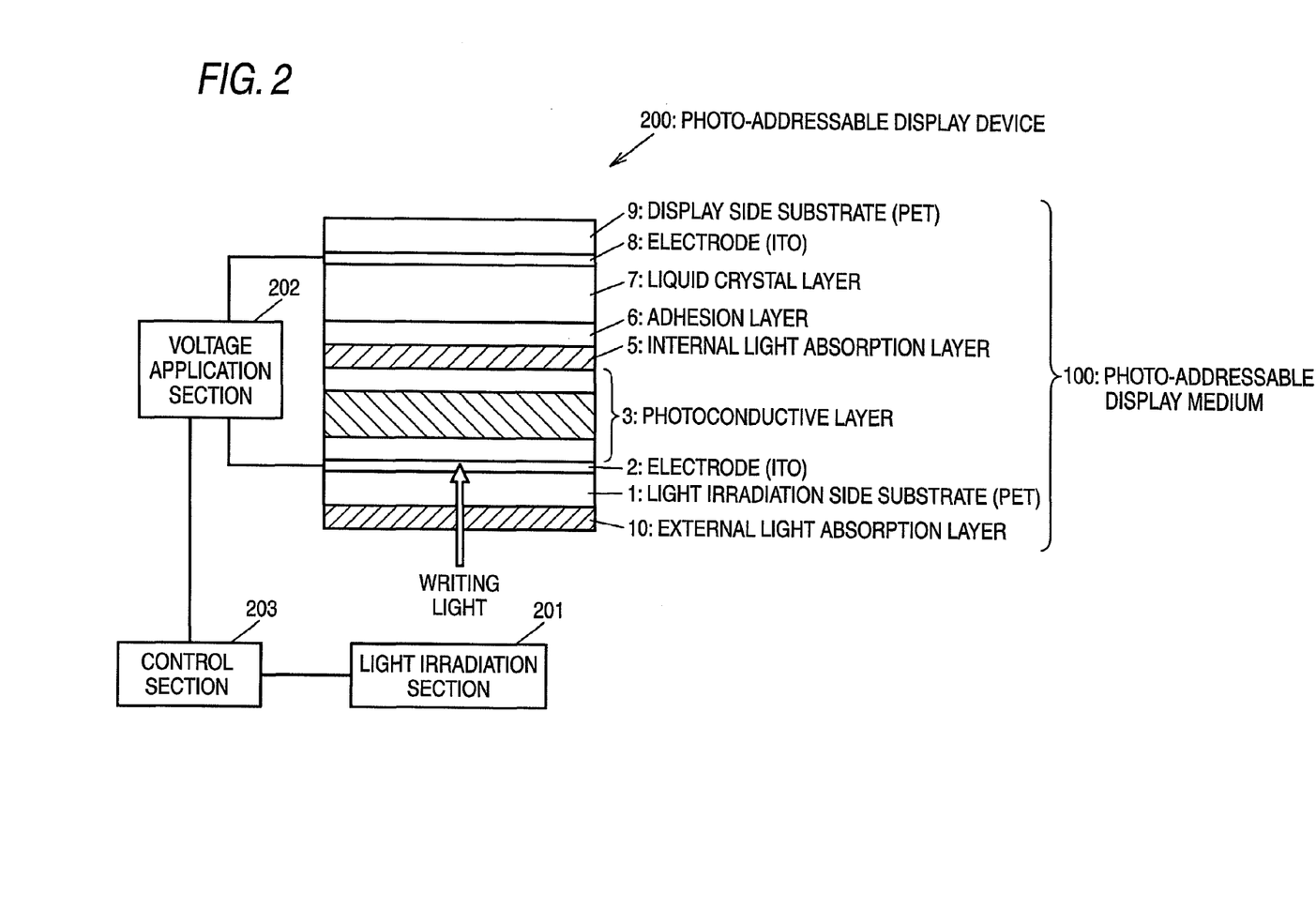
FIG. 2 is an outline view showing a constitutional example of a photo-addressable display device according to an exemplary embodiment of the invention.

Constitution of Photo-Addressable Display Device:

FIG. 2 is an outline view showing a constitution example of a photo-addressable display device according to an exemplary embodiment of the invention.

A photo-addressable display device 200 is provided with the aforementioned photo-addressable display medium 100, and a writing device (having at least a light irradiation section 201, a voltage application section 202 and a control section 203) for performing photo-writing to the display medium 100.

Writing Device:

The writing device is a device for writing an image to the display medium 100, which is constituted by including, for example, an exposure device for scanning and irradiating exposing light to the display medium 100 (the light irradiation section 201), the voltage application section 202 for applying voltage between the electrode 2 and the electrode 8 of the display medium 100, and the control section 203 that is electrically connected to the light irradiation section 201 and the voltage application section 202 and controls these.

The exposure device (the light irradiation section 201) has a light source that irradiates exposing light from the non-display surface side of the display medium 100 toward the photoconductive layer 3 via the light irradiation side substrate 1 or the external light absorption layer 10.

On the light source, no particular limitation is imposed, only when it is one that irradiates intended exposing light (spectrum, intensity, spatial frequency) to the photoconductive layer 3 of the display medium 100 on the basis of input signal from the control section 203. Meanwhile, as the exposing light irradiated from the light source is desirably light having a lot of energy of the absorption wavelength region of the photoconductive layer 3.

The voltage application section 202 is sufficient when it applies voltage, on the basis of the input signal from the control section 203, that has polarity and voltage value corresponding to the input signal between the electrode 2 and the electrode 8 of the display medium 100 for a time period corresponding to the input signal. As the voltage application section 202, for example, a bipolar high voltage amplifier or the like is employed.

The voltage application to the display medium 100 by the voltage application section is performed, specifically, between the electrode 2 and the electrode 8 via a contact terminal (a feeding terminal). Here, the contact terminal is a member that contacts to the voltage application section 202 and the electrodes 2 and 8 to make the both be in a conduction state, and one having a high electroconductivity and a small contact resistance with the voltage application section 202 and the electrodes 2 and 8 is selected. Meanwhile, the contact terminal desirably has such structure that enables it to be separated form either the electrodes 2 and 8 or the voltage application section 202, or from both, so that the display medium 100 may be separated from the writing device.

The control section 203 is constituted of CPU (Central Processing Unit), ROM (Read Only Memory), RAM (Random Access Memory) and the like, the diagrammatic representation thereof being omitted, which controls respective sections of the writing device according to a program stored in the ROM, and controls the exposure device (the light irradiation section 201) and the voltage application section 202 so as to display an image, which corresponds to image data obtained from an exterior device or the like via a wireless line or a wire line, on the display medium 100.

The display medium 100 may have a constitution unified with the writing device, or have a constitution separable from the writing device. When constituting so that the display medium 100 is separable from the writing device, for example, the display medium 100 may be constituted so that, by being mounted on a slot or the like whose diagrammatic representation is omitted, the electrodes 2 and 8 of the display medium 100 are so connected that voltage is applicable from the voltage application section 202, and that the display medium 100 is in such state that the exposing light may be irradiated from the non-display surface side of the display medium 100 toward the charge generation layer 3A of the photoconductive layer 3 from the exposure device.

When the display medium 100 is constituted separable from the writing device as described above, it becomes easy to distribute only the display medium 100 as a single item, and to provide it to browse, circulation, distribution and the like. Further, by mounting the display medium 100 again on a slot of the writing device, it becomes possible to write a new image or to delete a written image.

Operation of Photo-Addressable Display Device:

In the display device 200 so constituted as described above, the exposure device (the light irradiation section 201) and the voltage application section 202 are controlled by the control section 203 in accordance with the image data of an image to be written, and the image is written into the display medium 100. Specifically, by the control of the control section 203, voltage is applied between the electrode 2 and the electrode 8 from the voltage application section 202, and the exposing light from the light source of the exposure device (the light irradiation section 201) is irradiated from the non-display surface side of the display medium 100. As the result, an image is written to the display medium 100.

Here, when the external light absorption layer 10 is provided for the display medium 100, the exposing light is irradiated toward the photoconductive layer 3 via the external light absorption layer 10. Further, light from the sun or a fluorescent lamp that enters the display medium 100 is absorbed corresponding to the absorption region of the external light absorption layer 10 to be suppressed from arriving at the photoconductive layer 3. Consequently, the display medium 100 more excellent in light resistance is provided, and the optical degradation of the photoconductive layer 3 by external light is suppressed.

Next, the invention will be explained on the basis of Examples, but the invention is not limited by these Examples.

Example 1

The photo-addressable display medium 100 shown in FIG. 1 is prepared as follows.

Firstly, on an ITO film (the electrode 2) (thickness 800 angstroms) formed on polyethylene terephthalate (PET) (the light irradiation side substrate 1) (thickness 125 μm), the lower part charge generation layer 3C is formed. As the charge generation material, chlorogallium phthalocyanine (one that has diffraction peaks at the Bragg angle ($2\theta \pm 0.2°$) of 7.4°, 16.6°, 25.5°, and 28.3° in an X-ray diffraction spectrum) is employed, and polyvinyl butyral (S-LEC BX-5, manufactured by Sekisui Chemical Co., Ltd.) is employed as a binder. While setting a mass ratio thereof to 1:1, they are dispersed with a DYNO MILL using butanol to prepare a 4% by mass butanol dispersion liquid (a coating liquid A). On the ITO film, the coating liquid A is coated by a spin coat method, which is then dried to form the lower part charge generation layer 3C having thickness of 0.2 μm.

Next, on the lower part charge generation layer 3C, the charge transport layer 3B is formed. Specifically, firstly, a stilbene compound shown by the structural formula (III-1) is employed as the charge transport material, and polycarbonate {PCZ 300, manufactured by Mitsubishi gas Chemical Company, inc.} is employed as the binder resin. They are mixed at a mass ratio 3:2, which are then dissolved in monochlorobenzene to prepare a 20% by mass solution (a coating liquid B). The coating liquid B is coated on the lower part charge generation layer 3C using a spin coat method and dried to form the charge transport layer 3B having thickness of 6.5 μm.

Next, on the charge transport layer 3B, the upper part charge generation layer 3A is formed. Specifically, the coating liquid A is coated using a spin coat method and dried to form the upper part charge generation layer 3A having thickness of 0.2 μm.

As above, the photoconductive layer 3 is formed.

Next, on the photoconductive layer 3 having been formed, the internal light absorption layer 5 is formed.

Specifically, Pigment Blue 15:6 being blue pigment is dispersed in water so as to give a mass ratio of 1:1 relative to polyvinyl alcohol (POVAL 217EE, manufactured by Kuraray Co., Ltd.) being a binder resin to prepare a 10% by mass aqueous dispersion liquid (a coating liquid D). Then, the coating liquid D is coated on the photoconductive layer 3 by a spin coat method and dried to form the internal light absorption layer 5 having thickness of 1 μm.

Next, on the internal light absorption layer 5, a butyl acetate solution of a two-component type polyurethane-based adhesive, TAKENATE (A50)/TAKELAC (A315) (trade names, manufactured by Mitsui Chemicals inc.), is coated to form the adhesion layer 6 having thickness of 1.2 μm.

As above, a laminated body A is formed.

On the other hand, on an ITO film (the electrode 8) (thickness 800 angstroms) formed on polyethylene terephthalate (PET) (the display side substrate 9) (thickness 125 μm), the display layer (liquid crystal layer) 7 (thickness 20 μm) is formed.

Specifically, in 74.8 parts by mass of nematic liquid crystal E8 (manufactured by Merck & Co., Inc.) having positive permittivity anisotropy, 21 parts by mass of a chiral agent CB15 (manufactured by BDH Industries Ltd.) and 4.2 parts by mass of a chiral agent R1011 (manufactured by Merck & Co., Inc.) are dissolved with heating, and, after that, the temperature of the product is lowered to room temperature to give chiral nematic liquid crystal that selectively reflects light of blue-green color.

To 10 parts by mass of the blue-green chiral nematic liquid crystal, 3 parts by mass of an adduct of xylene isocyanate 3 moles and trimethylolpropane 1 mole (D-110N, manufactured by Takeda Chemical Industries, Ltd.), and 100 parts by mass of ethyl acetate are added to form a homogeneous solution and to form liquid to be an oil phase. On the other hand, 10 parts by mass of polyvinyl alcohol (POVAL 217EE, manufactured by Kuraray Co., Ltd.) is added to 1000 parts by mass of heated ion-exchanged water, which is stirred and left to be cooled to prepare liquid for a water phase.

Next, 10 parts by mass of the oil phase is emulsified and dispersed in 100 parts by mass of the water phase for one minute by a mixer for home use to which 30 V alternating current is applied with a slidac to prepare oil-in-water emulsion in which oil phase droplets are dispersed in the water phase. The oil-in-water emulsion is stirred for 2 hours while heating with a water bath at 60° C. to complete interfacial polymerization, thereby forming a liquid crystal microcapsule. An average particle diameter of obtained liquid crystal microcapsules is measured with a laser particle size distribution meter and is estimated as about 12 μm.

After filtering the obtained liquid crystal microcapsule dispersion liquid through a stainless-steel mesh having a mesh size of 38 μm, the filtrate is left for a whole day and night, and milk white supernatant is removed to give slurry constituted of a liquid crystal microcapsule having a solid component of about 40% by mass. To the obtained slurry, a 10% by mass polyvinyl alcohol solution is added so as to give polyvinyl alcohol in an amount of ⅔ relative to the mass of the solid component, to prepare a coating liquid C.

On the ITO film (the electrode 8), the coating liquid C is coated with a #44 wire bar to form the display layer (liquid crystal layer) 7 (thickness 50 μm)

As above, the laminated body B is formed.

Next, the laminated body A and the laminated body B are closely contacted so that the adhesion layer 6 contacts to the liquid crystal layer 7, which is subjected to lamination at 70° C. to prepare the photo-addressable display medium 100.

Example 2

A photo-writing medium is prepared in the substantially similar processes as that in Example 1, except for using a stilbene compound shown by the structural formula (III-2) as the charge transport material in the display medium 100 prepared in Example 1.

Example 3

A photo-writing medium is prepared in the substantially similar processes as that in Example 1, except for using a stilbene compound shown by the structural formula (III-3) as the charge transport material in the display medium 100 prepared in Example 1.

Example 4

Appropriate quantities of nematic liquid crystal E7 (manufactured by Merck & Co., Inc.), a first chiral agent (CB15, manufactured by Merck & Co., Inc.) and a second chiral agent (R1011, manufactured by Merck & Co., Inc.) are mixed to prepare a cholesteric liquid crystal that selectively reflects light of red color.

The red cholesteric liquid crystal is emulsified in 0.25% aqueous solution of sodium dodecylbenzene acid using a membrane emulsification devise (Micro kit, manufactured by SPG Technology Co., Ltd.) equipped with a ceramic porous membrane with 4.2 μm diameter. The average particle diameter of cholesteric liquid crystal drops in the obtained emulsion is measured with a laser particle size distribution meter and is estimated as about 15 μm. Thus obtained emulsion is left for a whole day and night. After the liquid crystal drops are precipitated, supernatant is removed to give concentrated emulsion in which the volume ratio of the liquid crystal drops is about 60% by mass. To the concentrated emulsion, 10% gelatin solution prepared in advance is added so that the weight ratio between liquid crystal and gelatin satisfies 7:3, to prepare a coating liquid for liquid crystal display layer (coating liquid E). Coating liquid E is coated by using an applicator and then dried to form a crystal liquid layer 7 having a film thickness of 20 μm.

Comparative Example 1

A photo-addressable display medium (Comparative Example 1) is prepared in the substantially similar processes, material and condition as those in Example 1, except for using a benzidine compound shown by a structural formula below in place of the stilbene compound shown by the structural formula (III-1) as the charge transport material in the display medium 100 prepared in Example 1.

Comparative Example 2

A photo-addressable medium (Comparative Example 2) is prepared in the substantially similar processes as that in Example 1, except for using a benzidine compound shown by a structural formula below as the charge transport material in the display medium 100 prepared in Example 1.

Evaluation of Light Resistance

For each of display media prepared in Examples 1 to 3 and Comparative Examples 1 to 2, the light resistance is evaluated in a process described below.

That is, for each of display media prepared in Examples 1 to 3 and Comparative Examples 1 to 2, writing is performed by applying a drive voltage of 300 V between electrodes (between ITOs corresponding to the first electrode and the second electrode) and irradiating exposure light of 1500 μW/cm$^2$, 660 nm for 0.1 second and then releasing the voltage application in a circumstance of 25° C. and 50% RH, and, after that, the reflectance is measured when white is displayed using a spectrometer CM-2022 (manufactured by Konica-Minolta).

Figure 3:
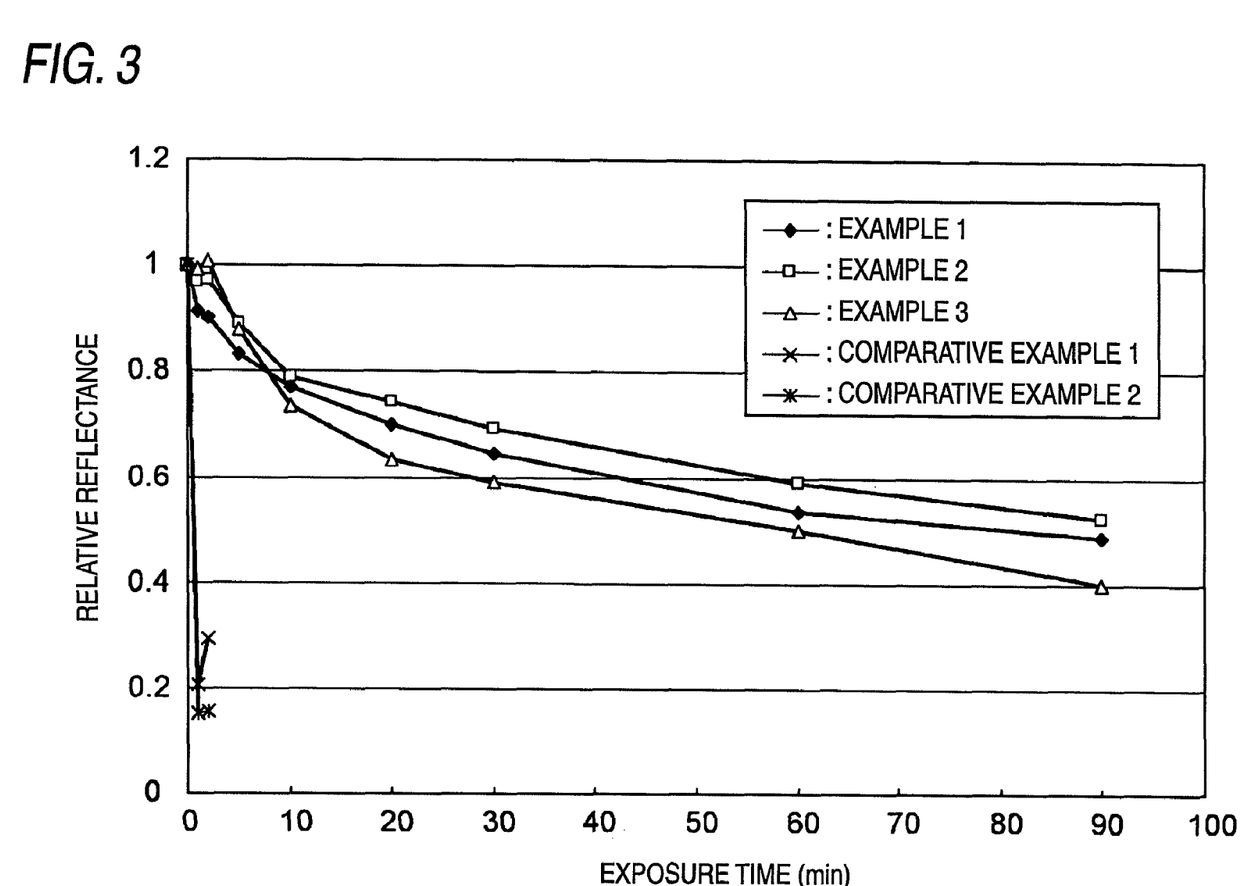
FIG. 3 is a drawing showing evaluation results regarding the light resistance for Examples 1 to 3 and Comparative Examples 1 to 2.

As the result, for each of media obtained in Examples 1 to 3 and Comparative Examples 1 to 2, about 35% change in the reflectance is found. Consequently, no difference is confirmed between Examples and Comparative Examples in the initial state (the state before the light exposure described below).

Next, for each of display media prepared in Examples 1 to 3 and Comparative Examples 1 to 2, the reflectance is measured in the same measurement condition as that for the initial state after light-exposing the lower part charge generation layer 3C side of the photoconductive layer 3 just under a pseudo-Sunlight (a xenon lamp, about 100,000 lux), in a circumstance of 25° C. and 50% RH. And, a ratio of the reflectance after the light exposure by the pseudo-Sun relative to the reflectance before the light exposure, which is defined as "1," is obtained as a relative reflectance to evaluate the light resistance. Results are shown in FIG. 3.

From FIG. 3, it is understood that media in Examples 1 to 3 have remarkably improved light resistance under the pseudo-Sun as compared with those in Comparative Examples 1 to 2.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A photo-addressable display medium, comprising:
a pair of electrodes having transparency;
a photoconductive layer disposed between the pair of electrodes, the photoconductive layer having a laminated structure of a first charge generation layer, a charge transport layer and a second charge generation layer in this order from an exposing light irradiation side; and
a liquid crystal layer disposed between an electrode of an inverse side to the exposing light irradiation side out of the pair of electrodes and the second charge generation layer, the liquid crystal layer having memory performance,
wherein the first charge generation layer and the second charge generation layer contain a phthalocyanine compound, and
the charge transport layer contains a stilbene compound represented by following formula (1):

formula (1)

wherein, $R_1$ to $R_4$ each independently represents a hydrogen atom, a methyl group or an ethyl group.

2. The photo-addressable display medium according to claim 1,
wherein the stilbene compound is a stilbene compound represented by following formula (2):

formula (2)

wherein, $R_1$ to $R_4$ each independently represents a hydrogen atom, a methyl group or an ethyl group.

3. The photo-addressable display medium according to claim 2,
wherein the stilbene compound is at least one stilbene compound selected from the group consisting of stilbene compounds represented by following structural formulae (III-1), (III-2) and (III-3):

structural formula (III-1), structural formula (III-2), structural formula (III-3).

4. The photo-addressable display medium according to claim 1,
wherein the phthalocyanine compound contained in the first charge generation layer is a phthalocyanine compound selected from the group consisting of
(1) chlorogallium phthalocyanine of a crystalline structure having diffraction peaks at Bragg angle ($2\theta \pm 0.2°$) of i) 7.4°, 16.6°, 25.5° and 28.3°; ii) 6.8°, 17.3°, 23.6° and 16.9°; or iii) 8.7° to 9.2°, 17.6°, 24.0°, 27.4° and 28.8° in an X-ray diffraction spectrum,
(2) hydroxygallium phthalocyanine of a crystalline structure having diffraction peaks at Bragg angle ($2\theta \pm 0.2°$) of i) 7.5°, 9.9°, 12.5°, 16.3°, 18.6°, 25.1° and 28.3°; ii) 7.7°, 16.5°, 25.1° and 26.6°; iii) 7.9°, 16.5°, 24.4° and 27.6°; iv) 7.0°, 7.5°, 10.5°, 11.7°, 12.7°, 17.3°, 18.1°, 24.5°, 26.2° and 21.1°; v) 6.8°, 12.8°, 15.8° and 26.0°; or vi) 7.4°, 9.9°, 25.0°, 26.2° and 28.2° in an X-ray diffraction spectrum, and
(3) titanyl phthalocyanine of a crystalline structure having diffraction peaks at Bragg angle ($2\theta \pm 0.2°$) of i) 9.3° and 26.3°; or ii) 9.5°, 9.7°, 11.7°, 15.0°, 23.5°, 24.1° and 27.3° in an X-ray diffraction spectrum.

5. The photo-addressable display medium according to claim 1,
wherein the phthalocyanine compound contained in the second charge generation layer is a phthalocyanine compound selected from the group consisting of
(1) chlorogallium phthalocyanine of a crystalline structure having diffraction peaks at Bragg angle ($2\theta \pm 0.2°$) of i) 7.4°, 16.6°, 25.5° and 28.3°; ii) 6.8°, 17.3°, 23.6° and 26.9°; or iii) 8.7° to 9.2°, 17.6°, 24.0°, 27.4° and 28.8° in an X-ray diffraction spectrum,
(2) hydroxygallium phthalocyanine of a crystalline structure having diffraction peaks at Bragg angle ($2\theta \pm 0.2°$) of i) 7.5°, 9.9°, 12.5°, 16.3°, 18.6°, 25.1° and 28.3°; ii) 7.7°, 16.5°, 25.1° and 26.6°; iii) 7.9°, 16.5°, 24.4° and 27.6°; iv) 7.0°, 16.5°, 10.5°, 11.7°, 12.7°, 17.3°, 18.1°, 24.5°, 26.2° and 27.1°; v) 6.8°, 12.8°, 15.8° and 26.0°; or vi) 7.4°, 9.9°, 25.0°, 26.2° and 28.2° in an X-ray diffraction spectrum, and
(3) titanyl phthalocyanine of a crystalline structure having diffraction peaks at Bragg angle ($2\theta \pm 0.2°$) of i) 9.3° and 26.3°; or ii) 9.5°, 9.7°, 11.7°, 15.0°, 23.5°, 24.1° and 27.3° in an X-ray diffraction spectrum.

6. The photo-addressable display medium according to claim 1, further comprising:
a light absorption layer disposed at the light irradiation side relative to an electrode of the exposing light irradiation side, the light absorption layer transmitting exposing light.

7. A photo-addressable display device, comprising:
the photo-addressable display medium according to claim 1; and
a writing device that performs photo writing to the display medium.

* * * * *